(12) United States Patent
Roby

(10) Patent No.: US 6,895,745 B2
(45) Date of Patent: May 24, 2005

(54) SECONDARY COMBUSTION FOR REGENERATION OF CATALYST AND INCINERATION OF DEPOSITS IN PARTICLE TRAP OF VEHICLE EXHAUST

(75) Inventor: Steve Roby, Ashville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/407,382

(22) Filed: Apr. 4, 2003

(65) Prior Publication Data

US 2004/0194447 A1 Oct. 7, 2004

(51) Int. Cl.$^7$ ............................................. F01N 3/00
(52) U.S. Cl. ..................... 60/280; 60/286; 60/295; 60/303; 60/606; 60/607
(58) Field of Search .................. 60/274, 280, 286, 60/287, 291, 292, 295, 300, 303, 606, 607

(56) References Cited

U.S. PATENT DOCUMENTS 4,004,414 A * 1/1977 Melchior et al. ............. 60/606
4,018,053 A * 4/1977 Rudert et al. ................. 60/606
4,185,459 A * 1/1980 Holste ........................... 60/280
4,449,370 A * 5/1984 Ream ............................ 60/606
6,672,050 B2 * 1/2004 Murata et al. ................. 60/284

FOREIGN PATENT DOCUMENTS

DE              003826600 A1 * 2/1990 ................... 60/606

* cited by examiner

Primary Examiner—Binh Q. Tran
(74) Attorney, Agent, or Firm—Pendorf & Cutliff; Greg Dziegielewski

(57) ABSTRACT

A system and device for providing secondary combustion for regeneration of catalyst in a catalytic converter (24) and/or for regeneration of a particulate trap (21) is provided. The secondary combustion takes place in the exducer chamber (13) of a turbine of a turbocharger (2), and generates heat for bringing a catalyst up to peak oxidation or reduction temperature, for regeneration of a catalyst, and incineration of particulates in a trap. The system takes advantage of heat and turbulence in the exducer chamber for promoting fuel/air mixture and for simplifying the amount of parts needed to incorporate a secondary combustion means into a turbocharger equipped primary combustion system (1).

9 Claims, 1 Drawing Sheet

SECONDARY COMBUSTION FOR REGENERATION OF CATALYST AND INCINERATION OF DEPOSITS IN PARTICLE TRAP OF VEHICLE EXHAUST

FIELD OF THE INVENTION

The present invention concerns a system and device for secondary combustion in a vehicle exhaust, useful for generating heat for regeneration of catalyst and/or incineration of deposits in the particle trap. The system and device are capable of being operated completely independently of engine operation, and are particularly suitable for turbocharged diesel powered vehicles.

BACKGROUND OF THE INVENTION

The combustion of fuel in a diesel or Otto engine results in production of various pollutants such as heavy hydrocarbon particles, carbon monoxide, nitrogen oxides ($NO_x$) and carbonaceous particulate matter. Emissions control requirements mandate low levels of emissions.

Among exhaust gas cleaning systems, $NO_x$ storage catalytic converters are well known. This type of catalytic converter is comprised of two material components. The first serves for adsorbing and storing $NO_x$ during lean operation of the engine. Lean operation is when the combustion air ratio lambda ($\lambda$) is greater than 1, that is, if there is hyperstoichiometric combustion, in which there is residual oxygen in the exhaust gas.

The second material component is a catalytic material with three-way characteristics. In order to regenerate the storage catalytic converter, a reducing exhaust gas with high reducing agent content is needed to cause release of $N_x$ stored in the first component and reduction of the $NO_x$ to molecular nitrogen ($N_2$) and oxygen ($O_2$) in the presence of the catalyst. An internal combustion engine produces reducing exhaust gas when there is "rich" combustion, that is to say, hypostoichiometric combustion with $\lambda<1$, in which there is no or only a little residual oxygen in the exhaust gas.

Diesel engines preferably operate with excess oxygen ($\lambda>1$) over the entire characteristic map area. However, for the above discussed reasons, in order to be able to use an $NO_x$ adsorber system the diesel engine must be changed over from time to time from lean to rich operation and back again. Such systems are described for example in DE 195 43 219 C1. However, programming engine operation for the required relationship between the lean operating phase and the rich operating phase in the combustion control of the vehicle engine is complex. Further, software must be tailored to each version and modification of the engine and associated equipment. There is a need for a simple system for catalyst regeneration, capable of being operated without interfering with the operation of the engine and capable of operating indepenent of the condition of the engine.

Another problem with storage catalytic converters is that in some converters a lean-rich cycle with respectively equal durations of a lean and rich motor operating phases (for example 60 seconds each) is required. This results in inefficient engine operation.

Yet another problem with catalytic converters is that catalysts are most effective at operating temperatures of 300° to 400°. During cold start-up of the engine the catalyst is inefficient, $NO_x$ emissions are high, and emissions standards may not be met. At low load conditions or at idle, exhaust temperatures may only reach 200° C. At this low exhaust gas temperature the catalytic converter is cool and ineffective. It is known to increase exhaust gas temperature by retarding ignition timing in gasoline engines or retarding fuel injection timing in diesel engines (since heat of combustion not converted into mechanical work is vented to the exhaust), but the resulting increase in temperature is limited. Further, retarding timing reduces engine power, hampering engine operability.

It is also well known to reduce emissions of particulates—flammable fine particles which in diesel engines are the main cause of black smoke in exhaust gas. For this, particulate traps are provided upstream of catalytic converter. Diesel particulates collected in the particulate trap undergo self burning at 500° C., or 350° C. in the presence of an oxidation catalyst. Exhaust temperature can reach 500° C. only at high speeds or under high loads. Under typical operating conditions such high exhaust temperatures are not experienced for sufficient time periods to clear the trap. Thus, particulates accumulate and and eventually the trap becomes plugged, increasing backpressure. For this reason, systems for artificially increasing temperature upstream of the particle trap are known and are referred to as auxiliary or "regenerative" burners. Burners in the exhaust pipe just upstream of the particulate trap are disclosed for example in U.S. Pat. Nos. 4,567,725, 4,677,823 and 5,826,428. However, it is difficult to maintain stable combustion at low pressures. Further, these systems suffer from disadvantages associated with cost, safety and durability. For cost and weight reasons burners tend to be made of relatively thin sheet metal, and for engineering reasons they tend to be located near to the vehicle fuel tank. With a limited explosive containment rating, the danger of locating such a thin walled burner near a vehicle fuel tank is readily apparent. Further, parking a vehicle with a hot burner in the exhaust pipe on a flammable surface such as dry grass is dangerous.

It is thus an object of the invention to provide a system and device for regeneration of catalyst and also for regeneration of the particulate trap which does not interfere with the lean operation ($\lambda>1$) of a diesel engine, can operate as needed completely independently of the operating condition of the engine, can provide a reducing exhaust gas to a $NO_x$ storage catalytic converter when necessary for initiating catalyst regeneration, without requiring switching of the engine to rich operation, can quickly raise the temperature of a $NO_x$ storage catalytic converter to a peak catalyst, temperature of 300° C. to 400° C. as needed for catalyst regeneration, even immediately following cold startup of an engine, can quickly raise the temperature of a particle trap to 500° C. to 600° C. for incineration of particles and clearing of the particulate trap, and overcomes the problem of unstable combustion at low pressures associated with conventional in-tailpipe auxiliary burners.

SUMMARY OF THE INVENTION

The present invention overcomes the above problems, and particularly the problem of unstable combustion at low pressures associated with conventional auxiliary burners located in a vehicle tail pipe, by relocating the auxiliary burner to the turbine exducer chamber of a turbocharger.

Since the turbine exducer is already designed to accommodate high temperatures, no structural modification to the exducer is needed. The only modifications necessary involve provision of (1) means for introducing fuel, such as a diesel injector, and (2) means for igniting the fuel, such as a spark plug or glow plug.

The relatively high velocity and good swirl and turbulence of gas in the exducer chamber promotes excellent mixing of fuel and air, and the higher temperature and pressure in the exducer chamber, compared with conditions in the tailpipe, promotes efficient burning. Thus, utilizing the turbocharger turbine exducer chamber as a combustion chamber eliminates many of the problems, as well as components, associated with burners located in the tail pipe.

Since the diesel engine is preferably mapped to be continuously operated lean ($\lambda>1$), the present invention takes advantage of the presence of sufficient residual oxygen in the exhaust gas for operation of the auxiliary burner in the turbine exducer. Accordingly, it is not necessary to provide a secondary air feed port to introduce combustion air into the combustion chamber. However, inclusion of supplemental air introduction means is within the scope of the invention and may be employed under conditions when the turbine is not under load and the exhaust gas mixture is too rich for sustaining combustion, such as when deceleration or idling.

For initiation of catalyst regeneration, fuel is injected directly into the exducer chamber and preferably immediately combusted. Even though the engine itself is running lean, by this addition of fuel the exhaust gas becomes rich. Combustion results in the oxygen being consumed, resulting in a reducing exhaust gas as needed to cause release of $NO_x$ stored in the first component of the catalytic converter and to cause reduction of the $NO_x$ to molecular nitrogen ($N_2$) and oxygen ($O_2$) in the presence of the catalyst.

This auxiliary burner in the turbocharger turbine exducer also brings about an increase in exhaust gas temperature, and can quickly bring the temperature of the catalytic converter up to peak performance range. Thus, following a cold start, the catalytic converter is quickly brought to maximum range, and $NO_x$ emissions are maintained low.

Finally, the system quickly and safely brings exhaust gas temperature to the level necessary to incinerate and clear a particulate trap, e.g., in response to a backpressure signal or a pressure differential between the inlet and outlet of the particulate trap as well known in the art.

The system is particularly advantageous in that it operates completely independently of engine operation. Thus, there is no switching of the engine from lean to rich operation and back again, no retarding of timing of ignition or injection, no throttling, no loss of power, and no change in driving or handling characteristics experienced by the driver, and no need to remap engine operation for every engine and exhaust modification.

The foregoing has outlined rather broadly the more pertinent and important features of the present invention in order that the detailed description of the invention that follows may be better understood, and so that the present contribution to the art can be more fully appreciated. Additional features of the invention will be described hereinafter, which form the subject of the claims of the invention. It should be appreciated,by those skilled in the art that the conception and the specific embodiments disclosed may be readily utilized as a basis for modifying or designing other particulate trap or catalytic converter regeneration systems for carrying out the same purposes of the present invention. It should also be realized by those skilled in the art that such equivalent structures do not depart from the spirit and scope of the invention as set forth in the appended claims.

DESCRIPTION OF THE PREFERRED EMBODIMENT

Figure 1:
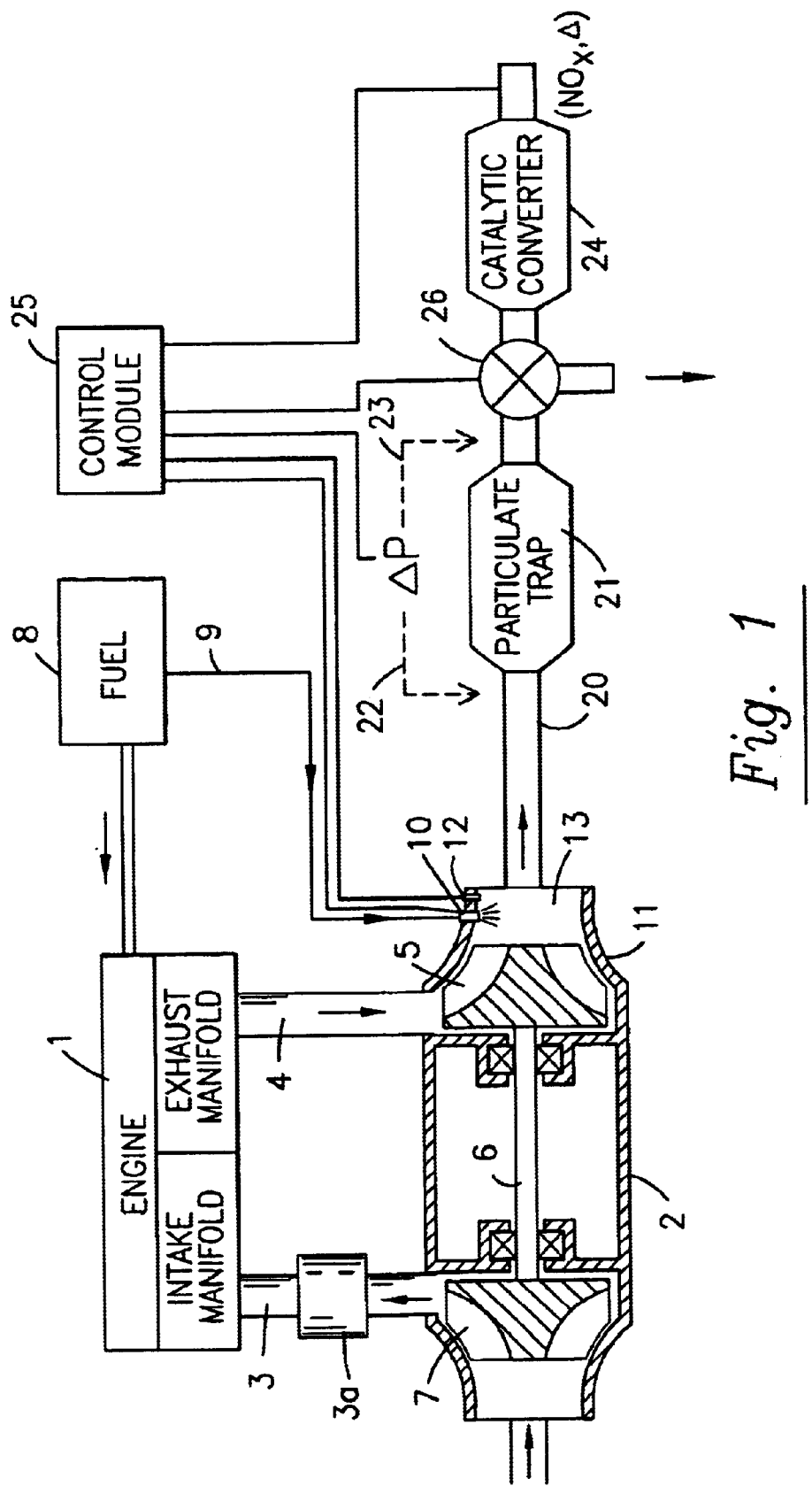
FIG. 1 illustrates a schematic drawing of the turbocharger according to the present invention.

The system and device for regeneration of catalyst and incineration of deposits in the particle trap of a vehichle exhaust of the present invention is illustrated in FIG. 1.

The engine 1 is in fluid communication with a turbocharger 2 via charge air intake manifold 3 and exhaust manifold 4. Exhaust gas discharged from an internal combustion engine 1 drives a turbine wheel 5 to a relatively high rotational speed (e.g., 190,000 RPM). The turbine wheel is located within a turbine housing and is mounted on one end of a shaft 6. A compressor impeller 7 is mounted on the other end of the shaft, and is driven by the turbine wheel to compress air. Since the temperature of the compressed air is elevated, charge air from the compressor may be cooled by intercooler 3a, lowering the temperature and/or increasing air density. This cooled compressed air is then communicated to the engine, thereby supplying charge air to the engine for increasing engine performance.

Fuel from fuel supply 8 is injected into the engine 1 via a fuel injector located in the wall of the exducer 11 of the turbocharger turbine housing 12. A fuel line 9 leads from the fuel supply 8 to the fuel injector 10. The injector comprises an injector body, an injector nozzle, a fuel passage and an orifice, and a solenoid-operated valve which may be opened or closed. The solenoid valve is substantially used for opening or closing the passage of the flow of fuel, and is under the control of electronic control module 25 (ECM) which, as discussed below, operates the particulate trap and/or catalyitic converter regeneration system in response to information received regarding the state of the particulate trap 21 and/or the catalytic converter 24. The system may, in conventional manner, include a fuel pressure regulator for maintaining the correct fuel pressure to injector 10. The fuel injector 10 is easily accessible and removable from outside the turbocharger turbine, thus is easily inspected, maintained, and/or repaired. Fuel flow rate may be in the range of 0.2–1.0 gallon per hour.

The term "exducer" as used herein generally means the section of the turbocharger turbine housing surrounding the exducer chamber, that is, the section of exhaust conduit between the turbine blades and the exhaust pipe. The exducer chamber is generally cast as one piece with the turbine housing, but could be manufactured as a separate piece if desired. The exducer chamber is generally thicker-walled than the exhaust pipe, and is designed to accommodate, for long periods, higher temperature and higher velocity gasses than the exhaust pipe.

In close proximity to the fuel injector 10 is an igniter, in this case spark plug 12. As fuel is atomized and injected into the exducer chamber 13, rapidly swirling hot exhaust gases leaving the exhaust turbine shear the fuel stream, further contributing to the break-up of the atomized fuel into a highly atomized fog of fuel and gases. This swirling air-fuel mixture is ignited within the exducer chamber 13 by the spark plug 12 to provide a sustainable combustion flame. This combustion within the exducer chamber increases the temperature of the exhaust gases with the desired results at the particulate trap and/or catalytic converter.

Although only one fuel injector and one igniter are shown in FIG. 1, it will be readily apparent that more than one fuel injector and/or more than one igniter may be located within the exducer chamber.

Referring back to FIG. 1, located in the exhaust pipe 20 upstream of a catalytic converter 23 is a particulate trap 21. The parciulate trap may include a trap carrier for collecting unburnt fine particles contained in exhaust gas, the trap carrier preferably supporting an oxidation catalyst.

The exhaust system shown in FIG. 1 further comprises a catalytic converter 24 and typically a muffler or silencer (not shown). A bypass valve under the control of the electronic control module may be located anywhere in the exhaust system for bypassing either the particulate trap, the catalytic converter, or both for conventional reasons.

The exhaust system of the present invention includes at least one of a particulate trap and one catalytic converter, but is not limited to only respectively one of these components. For example, an oxygen consuming exothermic catalytic converter may be located upstream of a $NO_x$ storage catalytic converter.

Included in the electronic control module is particulate trap regeneration control means. The quantity of the unburnt fine particulates deposited in said particulate trap may be determined by measuring the pressure differential using a pressure sensor 22 upstream of, and a pressure sensor 23 downstream of, the particulate trap 21. If the pressure exceeds an expected value, the control module sends a signal to the auxiliary burner (fuel injector and spark plug) for operating the latter. After a predetermined period of time, or when the pressure differential drops below a threshold after combustion of unburned fine particles, the control unit produces a signal for stopping the operation of the auxiliary burner. Alternatively, temperature can be measured before and after the particulate trap, and as the temperature differential drops (indicating completion of the exothermic particulate burning process) the particle trap regeneration process is automatically halted.

As discussed above, the essential point of the invention is that the auxiliary burner, previously located in the tail pipe near the particulate trap and/or catalytic converter, is now relocated to the exducer chamber of the turbocharger turbine.

Other than this change, the remaining components of the system—sensors (temperature, pressure, pressure differential, $O_2$, $NO_x$, etc), electronic control modules, particulate traps, catalytic converters, etc. are conventional, and may be freely selected and configured depending upon requirements of any particular engine and vehicle.

Systems for operating particulate traps and catalytic converters, and for controlling particl trap and catalytic converter regeneration means, as well as associated hardware and software, are disclosed in great detail in U.S. Pat. Nos. 4,452,040; 4,567,725; 4,677,823; 4,835,964; 5,271,223; 5,426,936; 5,826,428 6,029,316; and 6,311,666, the disclosures of which being incorporated herein by reference.

A partiulcate trap regeneration cycle will now be discussed by reference to an illustrative example, though it should be understood that the present invention is in no way limited to such an embodiment.

During operation engine exhaust gas exits the turbocharger turbine and flows through exhaust pipe 20 to the particulate trap 21 where the particulate is filtered therefrom. The filtered exhaust gas is passed to the muffler (not shown), preferably after passage through catalytic converter 24, and then to the atmosphere.

The pressure drop across particulate trap $\Delta P_D$ is monitored continuously by the control module and compared to a reference pressure drop ($\Delta P_R$). As particulates accumulate in the trap, $\Delta P_D$ increases. Regeneration is automatically triggered by the controller when the ratio of $\Delta P_D$ to $\Delta P_R$ reaches a predetermined value which is an approximate indication of when the trap load limit is reached. This ratio is nearly independent of engine speed and load conditions. Control module 25 is also programmed to initiate a regeneration cycle if one has not occurred within a preset operational time interval, the maximum time allowable between regenerations.

The ignition system, powered by a 12 volt battery, generates a continuous spark for approximately 5–10 seconds at the beginning of the regeneration cycle. The turbine exducer auxiliary burner lights during this period and is able to sustain combustion without the spark as long as fuel flow is uninterrupted. Hot gases from the burner flow to the particulate trap, oxidizing accumulated particulates. A bypass valve 26 may be provided to discharge the oxidized partles valve 26 to atmosphere during regeneration. At the end of the regeneration cycle, the fuel supply to the injector 10 is shut off and the diverter valve 26 returns to its spring loaded position, allowing exhaust to flow through the trap.

Turning now to the regeneration cycle for the catalytic converter, this will also be discussed by reference to a non-limiting example.

In a preferred embodiment of the method according to the invention, the level of adsorption of the storage catalytic converter element can be registered with the aid of characteristic maps in which the storage capacity of the storage catalytic converter element is stored as a function of its temperature and level of adsorption, and the exhaust-gas emission values of the diesel engine are stored as a function of the engine operating state. Using these characteristic maps, the increase in the adsorption per unit time is determined, starting from an initial level of adsorption at the beginning of a lean operating phase, and the respectively current level of adsorption is calculated.

$NO_x$ sensors communicate with the sensor system and are arranged in the exhaust-gas train upstream and downstream of the storage catalytic converter element. Using the $NO_x$ sensors, the level of adsorption of the storage catalytic converter element is determined and the quantity of $NO_x$ adsorbed by the latter is monitored.

Alternatively, in a simpler system, in order to determine the level of adsorption of the storage catalytic converter, an $NO_x$ sensor is provided which communicates with the sensor system and is arranged in the exhaust-gas train downstream of the storage catalytic converter element and monitors the quantity of $NO_x$ emerging from the storage catalytic converter element. In this case, a predetermined maximum value for the detected quantity of $NO_x$ is assigned to the predetermined level of adsorption at which point the catalyst regeneration process is initiated.

In the method according to the invention, one changeover criterion for terminating the regeneration process is the absence of one of the above discussed triggering criteria. Another termination criterion could be the expiry of a regeneration time, which depends on the respective level of adsorption of a storage catalytic converter element through which the exhaust gases from the diesel engine flow, at the beginning of the regeneration phase.

An additional or alternative regeneration termination criterion is the presence of a predetermined level of desorption of a storage catalytic converter element through which the exhaust gases from the diesel engine flow. In this case, the level of desorption of the storage catalytic converter can be monitored with the aid of characteristic maps in which the regeneration time for a storage catalytic converter element is stored as a function of the reducing agent output (hydrocarbons, carbon monoxide) during the regeneration process and the level of adsorption of the storage catalytic converter.

A further or alternative termination criterion in the method according to the invention is the presence of a predetermined reducing-agent content in the exhaust gases downstream of a storage catalytic converter element. This measure can be used to determine break-through of reducing agents through the storage catalytic converter. Such a break-through of reducing agents occurs when, following complete desorption and conversion of the stored nitrogen oxides, the excucer burner continues to provide rich exhaust gas. A reducing-agent break-through of this type is assumed, for example, when a predetermined threshold value for the HC emission and/or CO emission of the storage catalytic converter is exceeded, this threshold value being defined, preferably in characteristic maps, in accordance with the ratio of carbon monoxide to hydrocarbons in the exhaust gas of the diesel engine during operation of the exducer burner.

Furthermore, an additional or alternative criterion for initiation of combustion in the exducer chamber is the detection of an exhaust-gas temperature which lies below a predetermined threshold value. In order to detect the exhaust-gas temperature, a temperature sensor can be provided which is arranged in the exhaust-gas train upstream of a storage catalytic converter element through which the exhaust gases flow, and communicates with the electronic control module.

Although a system and device for secondary combustion in a vehicle exhaust, useful for generating heat for regeneration of catalyst and/or incineration of deposits in the particle trap, has been described herein with great detail with respect to an embodiment suitable for the automobile or truck industry, it will be readily apparent that the system and device are suitable for use in a number of other applications, such as marine turbine engines, power generating plants, etc. It is understood that the present disclosure of the preferred form has been made only by way of example and that numerous changes in the details of structures and the composition of the combination may be resorted to without departing from the spirit and scope of the invention.

What is claimed is:

1. A turbocharger comprising a turbine housing (2) for housing a turbine wheel, said turbine housing including an exducer chamber (13) into which exhaust gases are discharged from the turbine wheel, said turbocharger further comprising a fuel injector (10) for injecting fuel directly into said exducer chamber.

2. A turbocharger as in claim 1, further comprising an igniter (12) for igniting fuel injected into said exducer chamber (13) by said fuel injector (10).

3. A secondary combustion system for regeneration of catalyst in the exhaust of a primary combustion engine, comprising:

a turbocharger including an exhaust turbine (5) located in the exhaust stream of said internal combustion system (1) and including an exducer chamber (13);

a catalytic converter (24) located in the exhaust stream of said internal combustion system, downstream of said turbocharger;

a secondary combustion means located in said turbine exducer chamber (13), an electronic control module (25) for receiving sensed conditions of said catalytic converter and for transmitting signals to said secondary combustion means.

4. A secondary combustion system as in claim 3, wherein said secondary combustion means comprises a fuel injector (10) for injecting fuel directly into said exducer chamber and an igniter (12) for igniting fuel injected into said exducer chamber (13) by said fuel injector.

5. A secondary combustion system as in claim 3, wherein said electronic control module is programmed to initiate combustion in said secondary combustion means upon detection of a temperature below a predetermined threshold.

6. A secondary combustion system as in claim 3, wherein said electronic control module initiates combustion in said secondary combustion means upon detection of a $NO_x$ level downstream of said catalytic converter (24) above a predetermined threshold.

7. A secondary combustion system for regeneration of a particulate trap (21) in the exhaust (4, 20) of an primary combustion engine (1), comprising:

a turbocharger (2) including an exhaust turbine (5) located in the exhaust stream of said internal combustion system and including an exducer chamber (13);

a particulate trap (21) located in the exhaust stream of said internal combustion system, downstream of said turbocharger (2);

a secondary combustion means located in said turbine exducer chamber (13), an electronic control module (25) for receiving sensed conditions of said particulate trap (21) and for transmitting signals to said secondary combustion means.

8. A secondary combustion system as in claim 7, wherein said secondary combustion means comprises a fuel injector (10) for injecting fuel directly into said exducer chamber (13) and an igniter (12) for igniting fuel injected into said exducer chamber (13) by said fuel injector (10).

9. A secondary combustion system as in claim 7, wherein said electronic control module initiates combustion in said secondary combustion means upon detection of a pressure differential, measure upstream and downstream of said particulate trap, above a predetermined threshold.

* * * * *